(12) United States Patent
Harrington

(10) Patent No.: US 7,611,333 B1
(45) Date of Patent: Nov. 3, 2009

(54) MULTIPLE CHAMBER PUMP AND METHOD

(76) Inventor: Steven M. Harrington, 1293 Blue Sky Dr., Cardiff, CA (US) 92007

( * ) Notice: Subject to any disclaimer, the term of this patent is extended or adjusted under 35 U.S.C. 154(b) by 558 days.

(21) Appl. No.: 11/139,437

(22) Filed: May 27, 2005

Related U.S. Application Data

(63) Continuation-in-part of application No. 10/404,036, filed on Mar. 31, 2003, now Pat. No. 7,007,456.

(60) Provisional application No. 60/378,217, filed on May 7, 2002, provisional application No. 60/404,530, filed on Aug. 20, 2002.

(51) Int. Cl.
*F04F 1/06* (2006.01)
(52) U.S. Cl. .................. 417/142; 417/120; 417/143
(58) Field of Classification Search ............. 417/118, 417/120, 130, 131, 142, 143; 137/206–209, 137/564.5; 73/322.5; 441/21, 29; 114/123; 277/438; 60/259
See application file for complete search history.

(56) References Cited

U.S. PATENT DOCUMENTS

| | | | |
|---|---|---|---|
| 1,306,762 A | | 6/1919 | Higginson |
| 1,457,055 A | * | 5/1923 | Brewington ............... 73/322.5 |
| 1,469,647 A | * | 10/1923 | Ruegger ................ 73/322.5 |
| 1,628,608 A | * | 5/1927 | Newhouse ............... 417/125 |
| 3,213,804 A | | 10/1965 | Sobey |
| 3,576,153 A | * | 4/1971 | Doutt ..................... 92/244 |
| 3,680,981 A | * | 8/1972 | Wagner .................. 417/388 |
| 3,708,705 A | * | 1/1973 | Tinlin .................... 310/52 |
| 3,797,264 A | * | 3/1974 | Thibault et al. ............ 62/55.5 |
| 3,945,539 A | * | 3/1976 | Sossong ................ 222/386.5 |
| 4,141,533 A | * | 2/1979 | Goodman ................. 251/58 |
| 4,239,054 A | | 12/1980 | Van Rijn |
| 4,678,040 A | | 7/1987 | McLaughlin et al. |
| 5,092,743 A | | 3/1992 | Dietrich |
| 5,148,945 A | | 9/1992 | Geatz |
| 5,230,361 A | * | 7/1993 | Carr et al. ................. 137/416 |
| 5,655,938 A | * | 8/1997 | Huguenin et al. ............. 441/29 |
| 5,832,948 A | | 11/1998 | Schell |
| 5,927,653 A | * | 7/1999 | Mueller et al. ........... 244/171.3 |
| 6,095,759 A | | 8/2000 | Breslin |

(Continued)

OTHER PUBLICATIONS

Felix Godwin: "Exploring the Solar System": Plenum Press, 1960 (pp. 21-22).

(Continued)

*Primary Examiner*—Devon C Kramer
*Assistant Examiner*—Dnyanesh Kasture

(57) ABSTRACT

Disclosed is a pneumatically powered high-pressure and lightweight fluid pump. The pump is useful for pumping fuel for liquid rocket engines and for transferring liquids from one space vehicle to another. During operation of the pump, liquid is drained from a tank into a pump chamber and the chamber is then pressurized to deliver fluid. The chamber is then refilled from the main tank. An auxiliary chamber supplies fuel while the main chamber is being filled, thereby a steady stream is delivered from the pump. The auxiliary chamber is refilled from the tank while the main chamber is delivering fluid. In order to transfer fluid from the tank to the pump chamber, the pressure in the pump chamber is maintained at a pressure higher than the vapor pressure of the fluid being pumped but lower than the pressure in the tank.

24 Claims, 16 Drawing Sheets

U.S. PATENT DOCUMENTS

| | | |
|---|---|---|
| 6,200,104 B1 | 3/2001 | Park |
| 6,213,348 B1 | 4/2001 | Le Grouyellec |
| 6,314,978 B1 | 11/2001 | Lanning et al. |
| 6,368,068 B1 * | 4/2002 | Corlew et al. ............... 417/120 |
| 6,644,930 B1 | 11/2003 | Kuismanen |
| 6,914,531 B1 * | 7/2005 | Young ........................ 340/606 |
| 2004/0148925 A1 * | 8/2004 | Knight ........................ 60/259 |

OTHER PUBLICATIONS

Andrew Case: "Arocket Archives", Apr. 23, 2002 (http://blastzone.com/arocket/listarchivesmessage.asp?id_93173.

* cited by examiner

MULTIPLE CHAMBER PUMP AND METHOD

CROSS-REFERENCES TO RELATED APPLICATIONS

The present application is a Continuation-In-Part application ("CIP") of U.S. patent application Ser. No. 10/404,036, filed on Mar. 31, 2003, entitled "Dual Chamber Pump and Method," which claims the benefit of U.S. Provisional Application Ser. No. 60/378,217 filed on May 7, 2002 and entitled "Lightweight Pistonless Pump," and U.S. Provisional Application Ser. No. 60/404,530 filed on Aug. 20, 2002 and entitled "Pneumatic Pistonless Pump with Accumulator". Each of these applications are hereby incorporated by reference as if set forth in full in this document.

FIELD OF THE DISCLOSURE

The disclosure relates to pumps with multiple chambers and, more particularly, pumps with overlapping fill and dispense cycles for use in reduced absolute pressure environments.

BACKGROUND OF THE DISCLOSURE

Liquid fuel rocket engines require a supply of propellant at 300-8000 psi at a high flow rate and at a steady pressure. The propellant may be supplied from a tank at the required pressure or a pump may be used to raise the pressure of a propellant stored at low pressure. If a pump is used, it must be of minimum weight and have high reliability.

The most important factors for rocket performance are the type of propellant used and the empty or burnout mass of the rocket which contains a given amount of propellant. For any given propellant, the performance of a rocket depends of the weight of the propellant tanks, the weight of the engine and the weight of the pumps, if required. Each of these components must be as light as possible for optimum performance. Typically, there are two options for supplying propellant to the rocket engine, one way is to pressurize the tanks and the other way is to use a turbopump. Pressurizing the tanks, however, requires heavy tanks made from exotic and expensive high strength materials which reduce rocket performance because of their weight and increase the costs. If turbopumps are utilized, complexity of the rocket increases, and thus the reliability is decreased, and the costs are increased. Most all large liquid rockets from the V2 to the Atlas V's use a turbopump to supply fuel to the engine. In these rockets, the turbopump is one of the most complex components of the rocket system. Turbopumps typically rotate at 30,000-100,000 RPM to develop the power required for the rocket.

The cost of turbopumps reflect the large amount of engineering design and testing efforts that are required for turbopumps. Also, the manufacturing of turbopumps require precision machining of the exotic alloys. The failure of a turbopump usually results in an explosion, which can be disastrous to the rocket if the pump is filled with liquid oxygen. All of these items drive up the cost of a turbopumps. In addition, turbopumps cannot be run to the point of the fuel tank being empty due to problems with overspeeding and cavitation, both of which may also cause catastrophic failure. Therefore, a substantial amount of fuel must be left in the tank of the rocket that uses a turbopump, which increases the burnout weight of the rocket. A turbopump also requires a few seconds to startup, and during the startup time the rocket performance is not optimal. Furthermore, a rocket system which uses a turbopump generally burns a significant portion of the propellant in the gas generator which drives the turbopump, thereby decreasing the performance of the rocket vehicle.

SUMMARY OF THE DISCLOSURE

Disclosed is a pneumatically powered high-pressure and lightweight fluid pump. The pump is useful for pumping fuel for liquid rocket engines and for transferring liquids from one space vehicle to another. During operation of the pump, liquid is drained from a tank into a pump chamber and the chamber is then pressurized to deliver fluid. The chamber is then refilled from the main tank. An auxiliary chamber supplies fuel while the main chamber is being filled, thereby a steady stream is delivered from the pump. The auxiliary chamber is refilled from the tank while the main chamber is delivering fluid. In order to transfer fluid from the tank to the pump chamber, the pressure in the pump chamber is maintained at a pressure higher than the vapor pressure of the fluid being pumped but lower than the pressure in the tank.

One aspect of the disclosure includes a pneumatically driven multiple chamber pump that includes a primary chamber with a primary chamber volume capacity, an auxiliary chamber with an auxiliary chamber volume capacity, an outlet coupled to the primary chamber and the auxiliary chamber, and a vent system coupled to the primary chamber and the auxiliary chamber, and configured to maintain at least a predetermined pressure within each of the primary chamber and the auxiliary chamber.

The vent system can include, for example, a check valve having a spring configured to bias the check valve in a closed position coupled to at least one of the primary chamber or the auxiliary chamber, and configured to maintain the predetermined pressure in the chamber above a vapor pressure of fluid contained within the chamber, or a semi-sealed float in at least one of the primary chamber or the auxiliary chamber and configured to maintain the predetermined pressure in the chamber above a vapor pressure of a fluid contained within the chamber, or a toggle actuated valve positioned to control flow in at least one of a pressure or vent line for at least one of the primary chamber or the auxiliary chamber.

In another aspect, the disclosure includes a pneumatically driven multiple chamber pump that includes a primary chamber with a primary chamber volume capacity and having a primary chamber inlet configured to allow fluid to enter the primary chamber, an auxiliary chamber with an auxiliary chamber volume capacity and having an auxiliary chamber inlet configured to allow fluid to enter the auxiliary chamber, an outlet coupled to the primary chamber and the auxiliary chamber, the primary chamber configured to dispense fluid through the outlet during at least a portion of time that fluid enters the auxiliary chamber fills and the auxiliary chamber configured to dispense fluid through the outlet during at least a portion of time that fluid enters the primary chamber, a pressurization system coupled to the primary chamber and the auxiliary chamber and configured to pressurize the primary chamber prior to the time the primary chamber dispenses fluid through the outlet and configured to pressurize the auxiliary chamber prior to the time the auxiliary chamber dispenses fluid through the outlet, and a vent system coupled to the primary chamber and the auxiliary chamber, and configured to maintain at least a predetermined pressure equal to or greater than a vapor pressure of the fluid within each of the primary chamber and the auxiliary chamber.

In yet another aspect, the disclosure includes a pneumatically driven multiple chamber pump that includes a storage tank positioned internal of a rocket system, a rocket thrust chamber, a primary chamber comprising an inlet valve configured to accept fluid from the storage tank during a primary fill portion of a pump cycle, and an outlet valve configured to dispense fluid from the primary chamber to the rocket thrust chamber during a primary dispense portion of the pump cycle, an auxiliary chamber comprising an inlet valve configured to accept fluid from the storage tank during an auxiliary fill portion of the pump cycle that occurs at least partially during the primary dispense portion, and an outlet valve configured to dispense fluid from the auxiliary chamber to the rocket thrust chamber during an auxiliary dispense portion of the pump cycle that occurs at least partially during the primary fill portion, a pressurization system coupled to the primary chamber and the auxiliary chamber and configured to pressurize the primary chamber prior to the primary dispense portion of the pump cycle and configured to pressurize the auxiliary chamber prior to the auxiliary dispense portion of the pump cycle, and a vent system coupled to the primary chamber and the auxiliary chamber, and configured to vent the primary chamber and auxiliary chamber following the respective dispense portions of the pump cycle while maintaining at least a predetermined pressure equal to or greater than a vapor pressure of the fluid within each of the primary chamber and the auxiliary chamber.

In another aspect of the disclosure a multiple chamber pump for use in reduced pressure environments has a means to maintain the absolute pressure of the liquid at a level above its vapor pressure so as to prevent boiling or vaporization of the fluid being pumped.

BRIEF DESCRIPTION OF THE DRAWINGS

Various embodiments of the invention will now be described in greater detail with reference to the preferred embodiments illustrated in the accompanying drawings, in which like elements bear like reference numerals, and wherein.

DETAILED DESCRIPTION OF THE DISCLOSURE

Disclosed is a pneumatically powered high-pressure and lightweight fluid pump. The pump is useful for pumping fuel for liquid rocket engines and for pumping liquids from one space vehicle to another. During operation of the pump, liquid is drained from a tank into a pump chamber and the chamber is then pressurized to deliver fluid. The chamber is then refilled from the main tank. An auxiliary chamber supplies fuel while the main chamber is being filled, thereby a steady stream is delivered from the pump. The auxiliary chamber is refilled from the tank while the main chamber is delivering fluid. The design results in substantial weight savings over a system in which the main tank is pressurized or a system with two pump chambers of similar size. The auxiliary chamber of the present disclosure has a smaller capacity than the main chamber. The main chamber is designed to be filled much faster than it is emptied, therefore the smaller auxiliary chamber supplies fluid only during the time while the larger main chamber is being filled.

Figure 1:
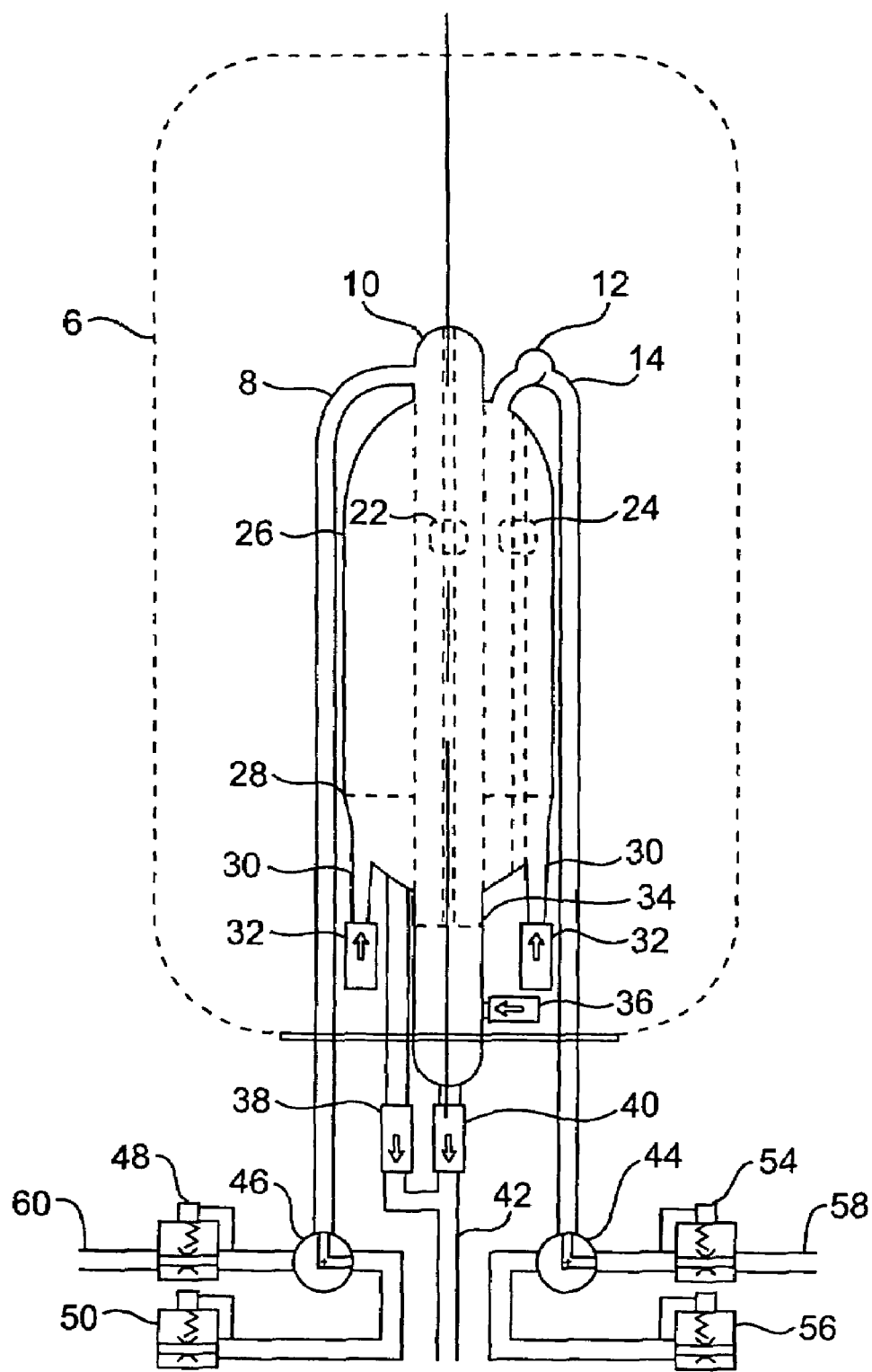
FIG. 1 is a cross sectional view of a multiple chamber pump installed in a tank according to the present disclosure.

Referring to FIG. 1, a cross sectional view of the multiple chamber pump according to the disclosure is shown installed internal of a storage tank 6. The multiple chamber pump is generally shown in the figures as a dual chamber pump for the sake of brevity of description. However, the multiple chamber pump is not limited to having only two chambers, but may have three or more chambers, and may be configured as one or more multiple chamber pumps operating independently or in combination.

The dual chamber pump embodiment shown in FIG. 1 includes a main chamber 26 with one or more check valves 32. Multiple check valves distributed symmetrically about axis of the pump chamber axis allow the pump to be filled with a minimum of swirling. The main chamber 26 also has at least one diffuser 30 to slow the fluid as it flows from storage tank 6, through check valve 32 into the main chamber 26. An outer float 24 is used to monitor the fluid level within the main chamber 26 and to determine when the main chamber 26 has been filled with fluid and to determine when the fluid has been drained from the main chamber 26. Also, a two position valve 44 is connected to the main chamber 26 and is used to either pressurize the main chamber 26 through a pressure regulator 54 or vent the main chamber 26 through a gas and water separator 12, and then through a back pressure regulator 56. An outlet check valve 38 and outline 42 are used to deliver the fluid to an engine, such as a rocket engine and to only allow the one way flow of fluid out of the main chamber 26 in the main chamber fluid delivery piping. The main chamber 26 also includes a supply line for receiving fluid from the storage tank 6.

An auxiliary chamber 10 can have a smaller volume capacity relative to the main chamber 26, but the difference in chamber volume is not a requirement for the multiple chamber pump. In other embodiments, the volume capacity of the main or primary chamber 26 can be substantially equal to the volume capacity of the auxiliary chamber 10. In other embodiments, the volume capacity of the auxiliary chamber 10 can be greater than the volume capacity of the primary chamber 26.

The auxiliary chamber 10 also has a smaller check valve 36 used to fill the auxiliary chamber with fluid. The auxiliary chamber 10 also has a float level sensor 22 to sense the level of fluid in the auxiliary chamber 10 and to determine when the auxiliary chamber 10 has been filled with fluid and to determine when the fluid has been drained from the auxiliary chamber 10. The auxiliary chamber 10 also has an outlet check valve 40 that only allows the fluid in the auxiliary chamber 10 to flow one way, out of the auxiliary chamber 10 in the auxiliary fluid delivery piping. The auxiliary chamber 10 also includes a supply line 8 to pressurize the auxiliary chamber 10 through valve 46.

The main chamber 26 has a major axis that runs longitudinally along the length of the main chamber 26. Also, the auxiliary chamber 10 is coaxially aligned with the main chamber 26. This allows the dual pump to be stable during the fill and dispense cycles since the weight of the two chambers are on the same axis. This prevents weight shift during the pump cycles which would make the rocket vehicle more difficult to control.

In addition, since the auxiliary chamber 10 has a smaller volume capacity relative to the main chamber 26 which reduces the overall weight of the dual pump since the auxiliary chamber volume capacity provides the minimum amount of flow required while the main chamber 26 is being refilled with fluid from the storage tank 6.

A three position valve 46 is used to either pressurize the auxiliary chamber 10 through a regulator 48, seal the auxiliary chamber 10, or vent the auxiliary chamber 10 through a back pressure regulator 50.

Figure 16:
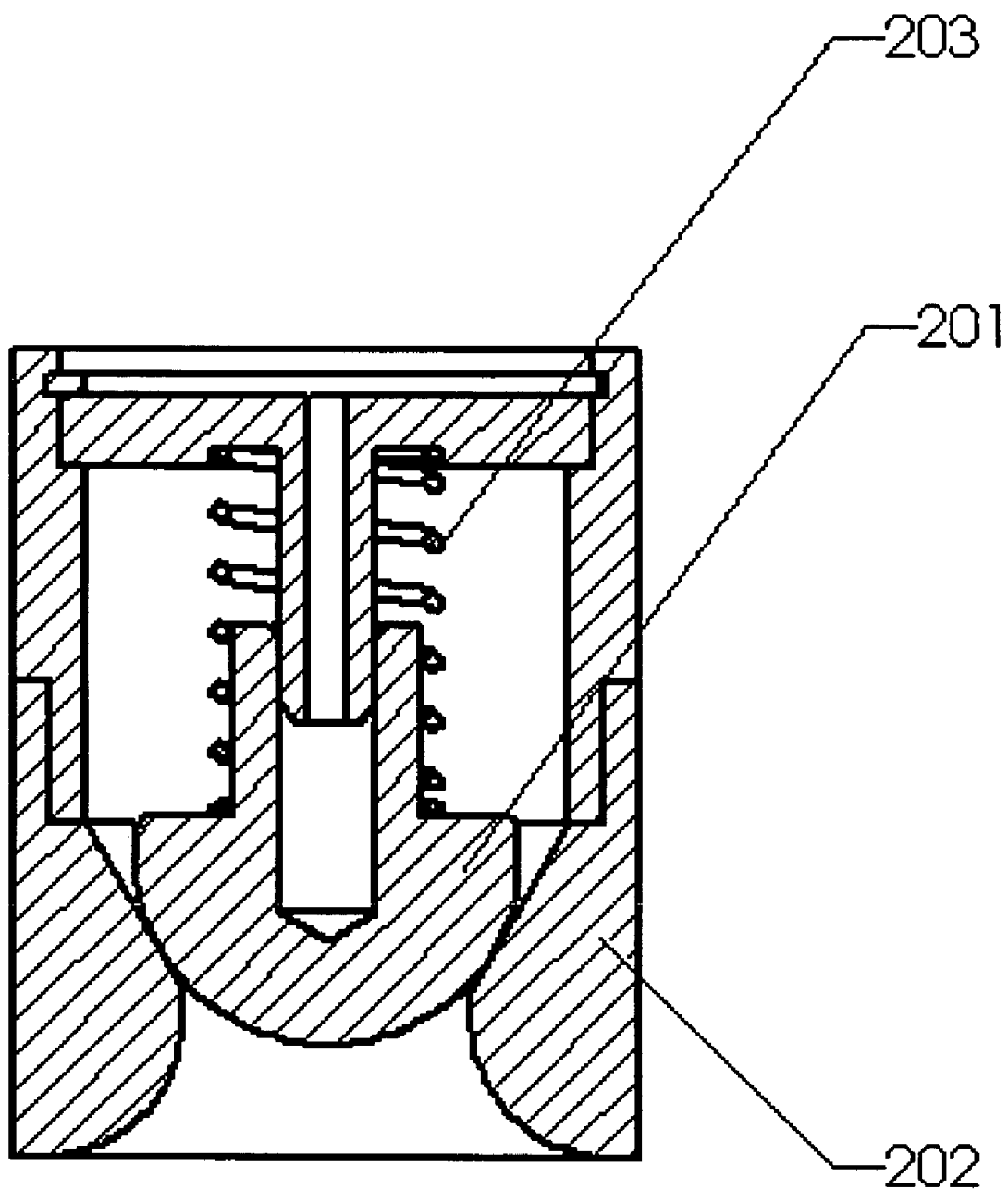
FIG. 16 is a cross sectional view of a spring loaded back pressure valve according to the present disclosure.

As shown in FIG. 16, the vent system can include, for example, a check valve having a spring 206 configured to bias the check valve poppet 201 in a closed position against the check valve seat 202 coupled to at least one of the primary chamber or the auxiliary chamber, and configured to maintain the predetermined pressure in the chamber above a vapor pressure of fluid contained within the chamber. In other embodiments, the vent system can include a semi-sealed float in at least one of the primary chamber or the auxiliary chamber that is configured to maintain the predetermined pressure in the chamber above a vapor pressure of a fluid contained within the chamber. In yet another embodiment, the vent system can include a toggle actuated valve such as the valve shown in FIG. 18 positioned to control flow in at least one of a pressure or vent line for at least one of the primary chamber or the auxiliary chamber.

Both the main chamber 26 and the auxiliary chamber 10 have baffles 28 and 34, respectively, and diffusers 30, to calm the fluid during entry into the chambers at high velocity. An electronic or pneumatic control system (not shown) maintains substantially steady flow by controlling the multi position valves 44 and 46.

The dual pump has a single point level sensor for the auxiliary chamber 10, a two set point level sensor for the main chamber 26, a two position valve to supply pressurized gas to the outer chamber and a three position valve to supply pressurized gas to the auxiliary chamber.

Figure 12:
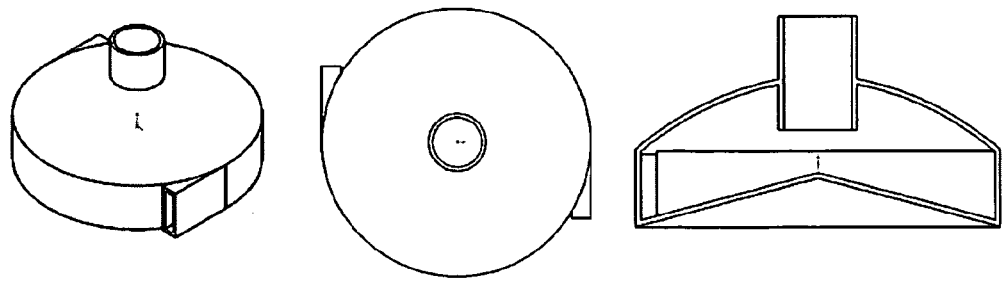
FIG. 12 is an isometric view, a top view and a cross sectional view of an air gas separator according to the present disclosure.
Figure 17:
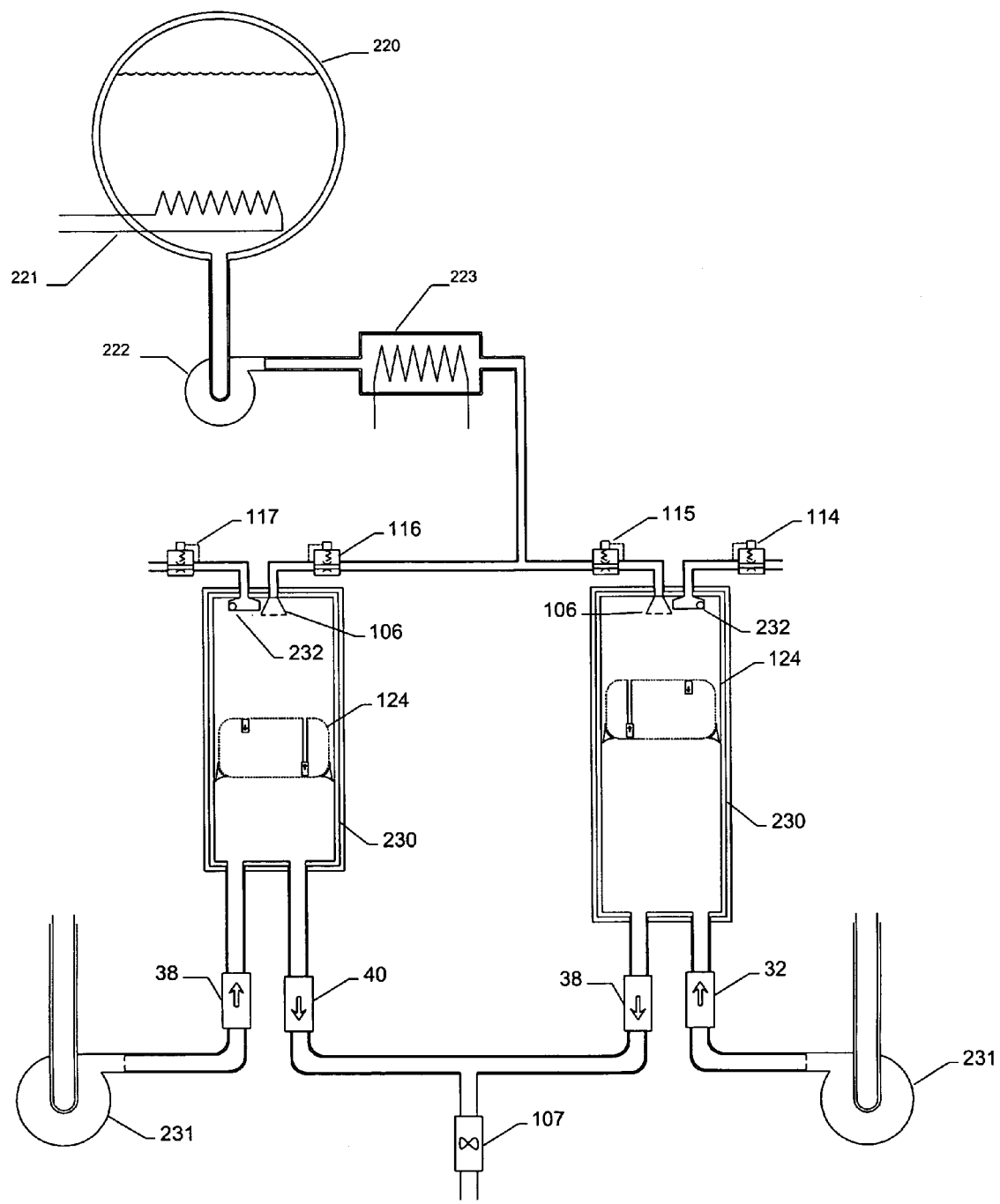
FIG. 17 is a cross sectional view of a pump with a helium supply tank according to the present disclosure.

As shown in FIG. 17, an air and liquid separator 232 may be used in the vent and pressurize lines to prevent loss of the fluid or propellant. This device can be configured to separate the gas from the liquid during the vent portion of the pump cycle and then return it to the pump chamber during the pressurization portion of the pump cycle under the force of gravity or acceleration. Devices which separate air and liquid based on the density differences are well known in the art. These devices can use centrifugal force, momentum or gravity to separate the denser liquid from the lighter gas. Examples of air and fluid separators include fluid diodes, where the mixture enters a cylindrical chamber tangentially and exits axially such as shown in FIG. 12, or calming chambers where the velocity of the mixture is slowed to the point where the liquid falls down under the force of gravity. The air and fluid separators typically need only store the fluid for a few seconds before returning it to the tank, so no fluid drain is required.

FIG. 17 depicts a system for supplying pressurized gas to the multiple chamber pump. In one embodiment, a Dewar 220 can be used to contain liquid helium. A heat exchanger 221 heats the helium in the Dewar to maintain the required pressure. A pump 222 may also be used alone or in combination with the heater to deliver the helium at the correct pressure. The helium is then heated in a heat exchanger 224. The heat exchanger can use heat from the fluid being pumped, or from a rocket engine Alternatively, a high pressure tank may supply helium for the pump. In this case the high pressure tank takes the place of the Dewar and the pump.

A low pressure tank of liquid helium 220 may be pumped up to pressure using a piston pump 222 such as is described by Schuck in U.S. Pat. No. 4,447,195, hereby incorporated herein by reference in its entirety. The high pressure supercritical helium may then be heated by either a rocket engine mounted heat exchanger (not shown) or a fuel heat exchanger 223 and then used to run the multiple chamber pump.

Figure 4:
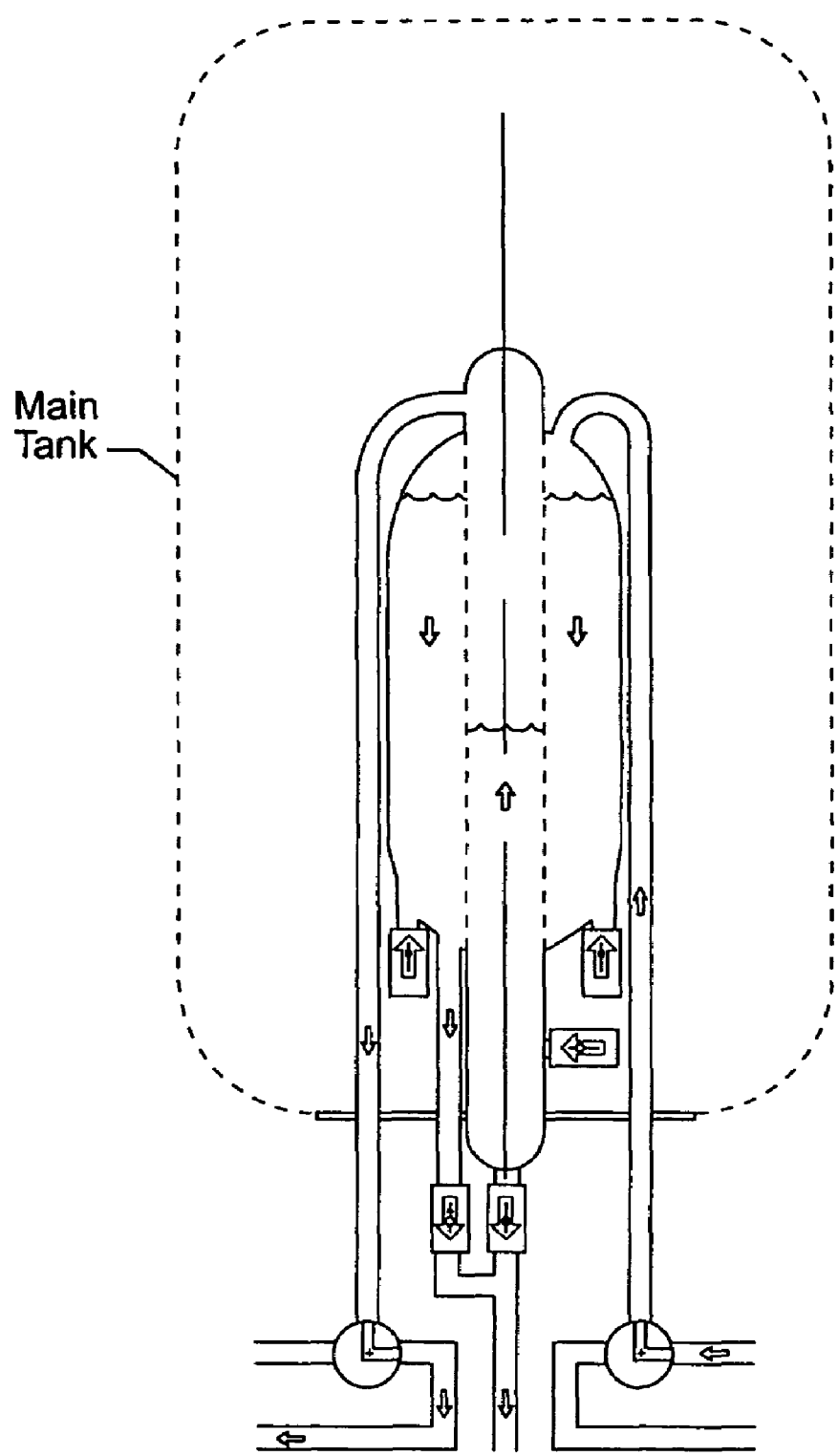
FIG. 4 is a cross sectional view of the multiple chamber pump showing the main chamber dispensing fluid while the auxiliary chamber is being filled.
Figure 5:
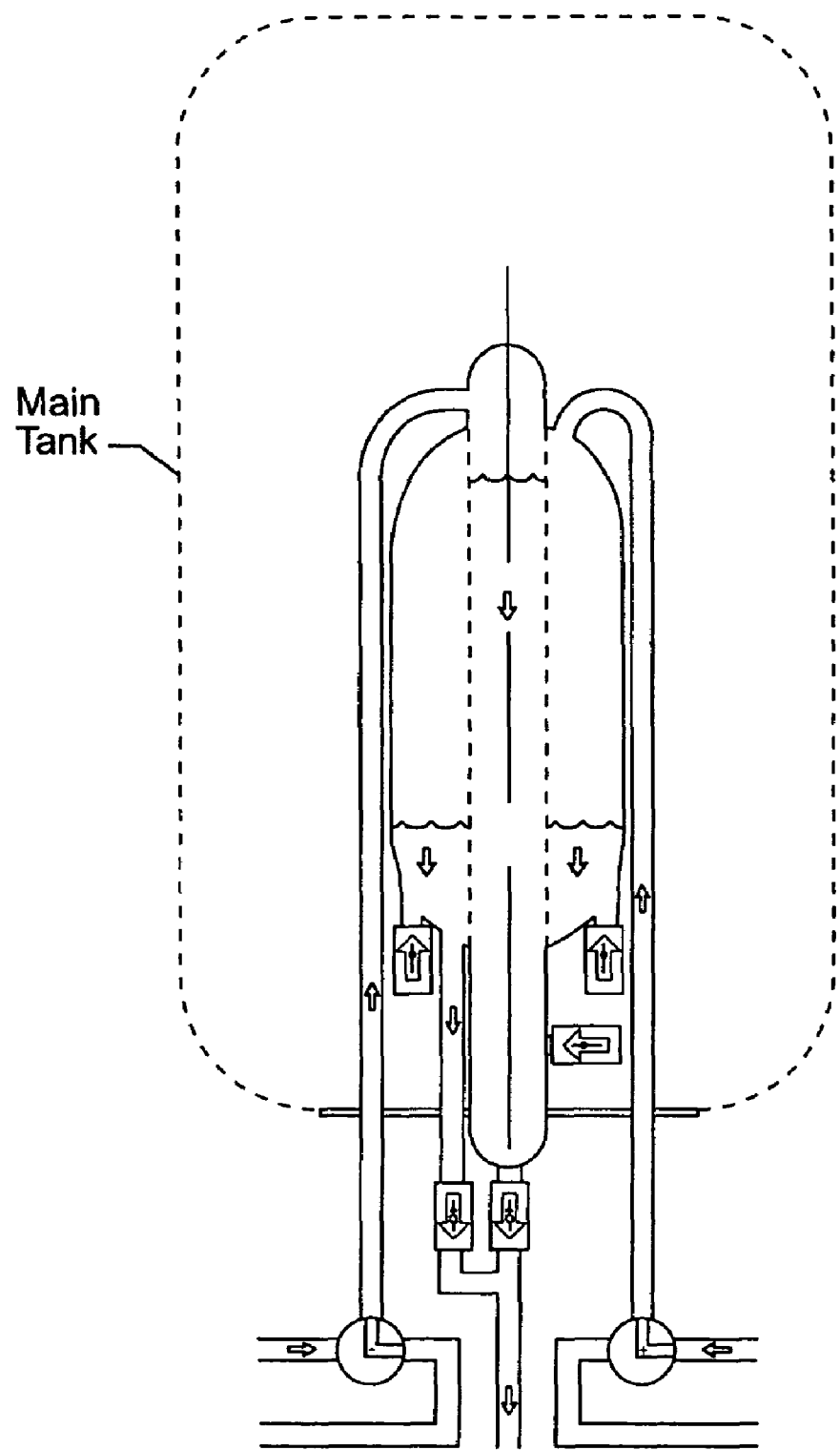
FIG. 5 is a cross sectional view of the multiple chamber pump showing both chambers dispensing fluid as the main chamber is low on fluid.
Figure 6:
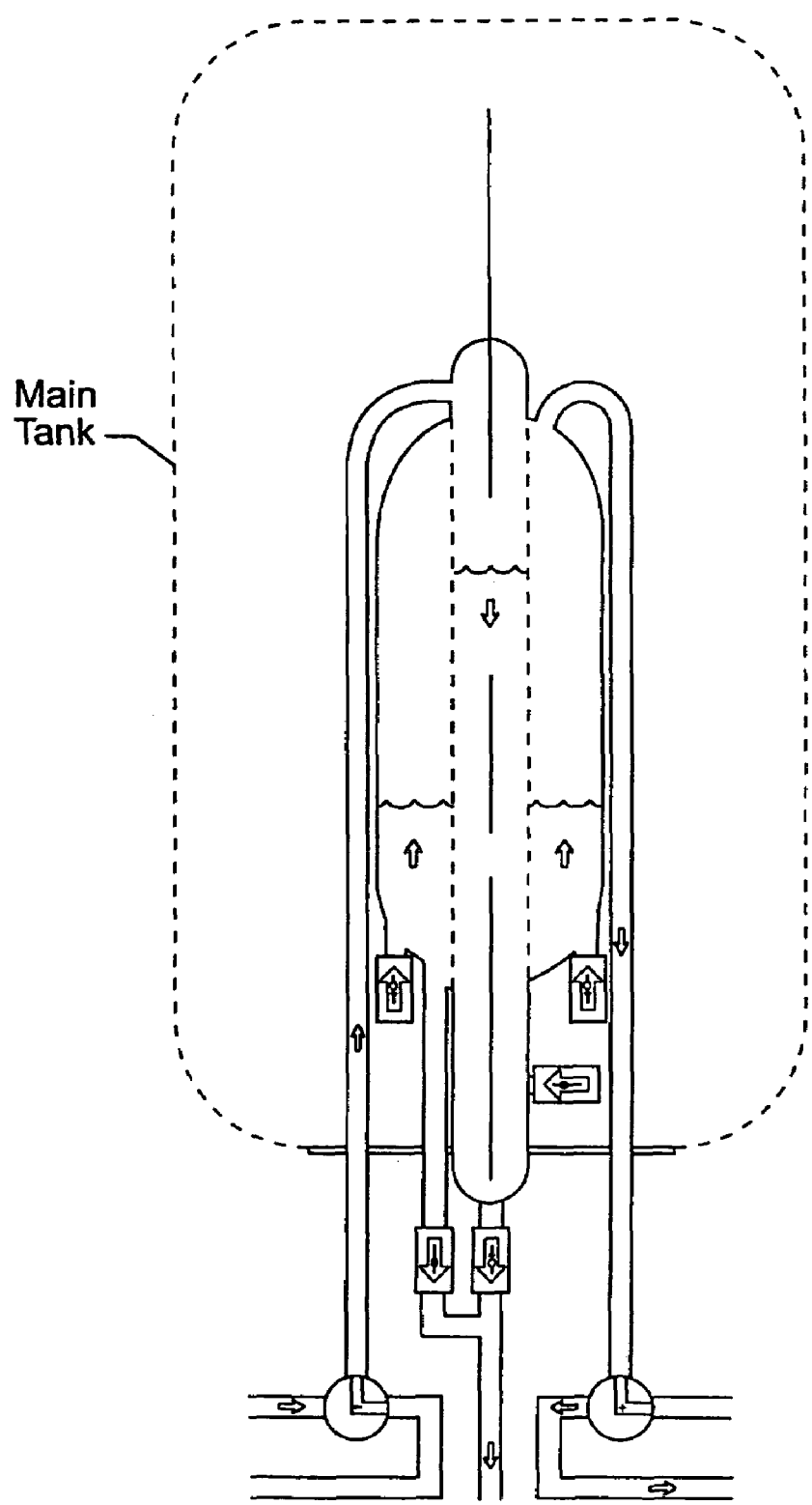
FIG. 6 is a cross sectional view of the multiple chamber pump showing the auxiliary chamber dispensing fluid while the main chamber is being filled.
Figure 7:
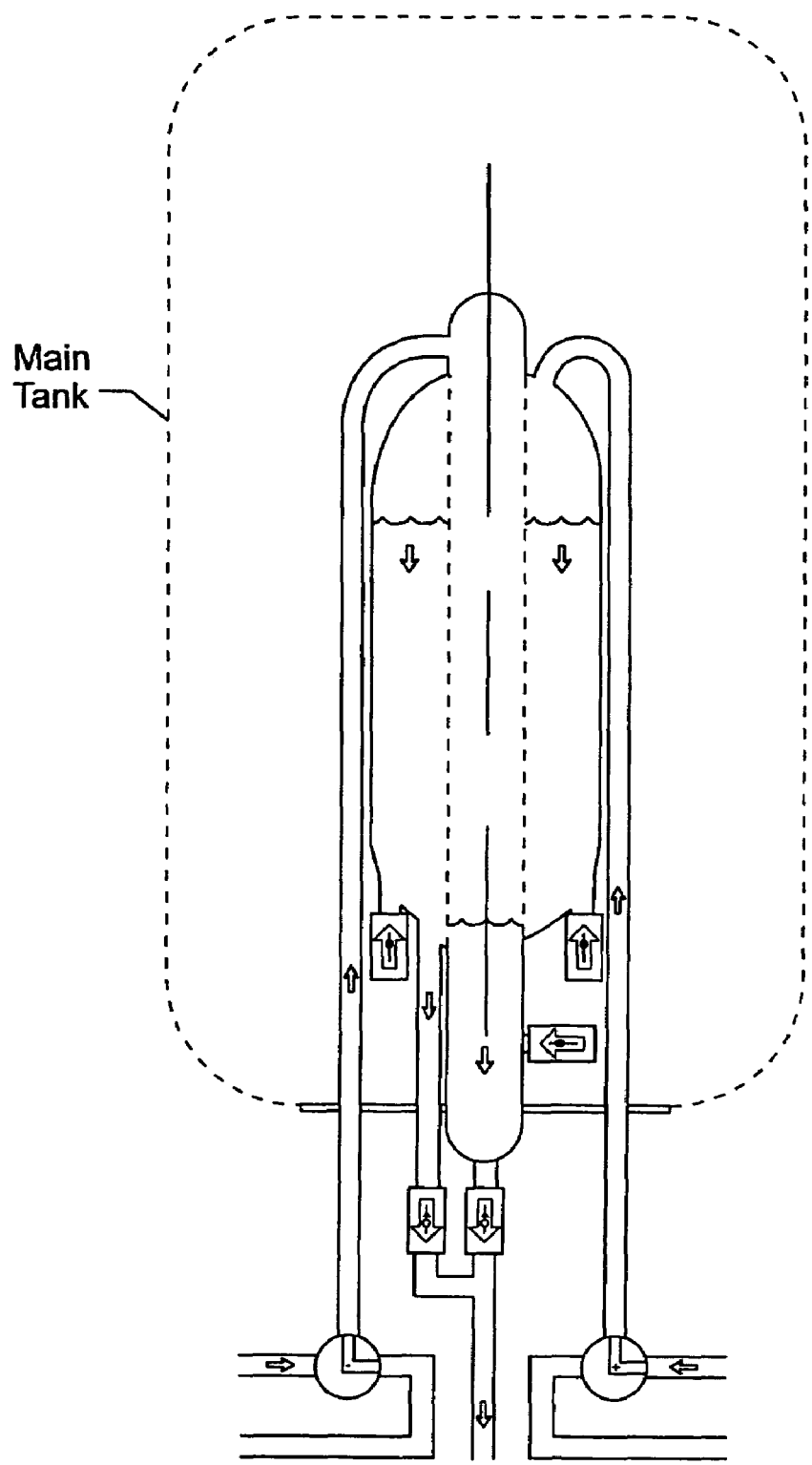
FIG. 7 is a cross sectional view of the multiple chamber pump showing both chambers dispensing fluid after the main chamber has been filled and pressurized with fluid.

The operation of the dual pump starts with both chambers filled and the outer chamber two position valve 44 being set to pressurize and the auxiliary chamber three position valve 46 being set to seal. In the rocket application, a valve (not shown) is opened so that fluid may flow or otherwise dispense from the main chamber 26 through the check valve 38 to the engine, as shown in FIG. 4. Now referring to FIG. 5, when the outer float 24 reaches a point designated as the low set point, the auxiliary chamber 10 is pressurized and the fluid briefly flows from both chambers. After flow is established from the auxiliary chamber 10, the main chamber 26 is vented by switching the two position valve 44 to vent and a primary fill portion of the pump cycle occurs where fluid flows under low pressure from the storage tank 6 into the main chamber 26, while simultaneously fluid flows at high pressure from the auxiliary chamber 10 through the check valve 40 to the engine, as shown in FIG. 6. Once the fluid within the main chamber reaches a point designated as the high set point, the main chamber two position valve 44 is set to pressurize. At this point, fluid is delivered briefly from both chambers, as shown in FIG. 7, and then the auxiliary chamber 10 three position valve 46 is set to vent. While fluid is being delivered from the main chamber 26, the auxiliary chamber 10 fills to a point designated as the auxiliary chamber set point. Then, the auxiliary chamber three position valve is set to seal the auxiliary chamber 10 until the main chamber 26 reaches the low set point. Then the cycle repeats itself, until instructed otherwise by the control system 113 shown in FIG. 8.

The multiple chamber pump is located within the storage tank 6, which is pressurized to a relatively low pressure. Under this pressure, the main chamber fills quickly. For example, the main chamber may fill in one second and then dispense for four seconds. The auxiliary chamber would fill in, for example, three seconds and dispense for 1.5 seconds, allowing time for overlap between the fill and dispense cycles. The cycle time should be five to ten times longer than the time required to vent and refill or pressurize the main chamber, otherwise, the cycle time is inefficient and some of the pressurized gas is lost.

Figure 11:
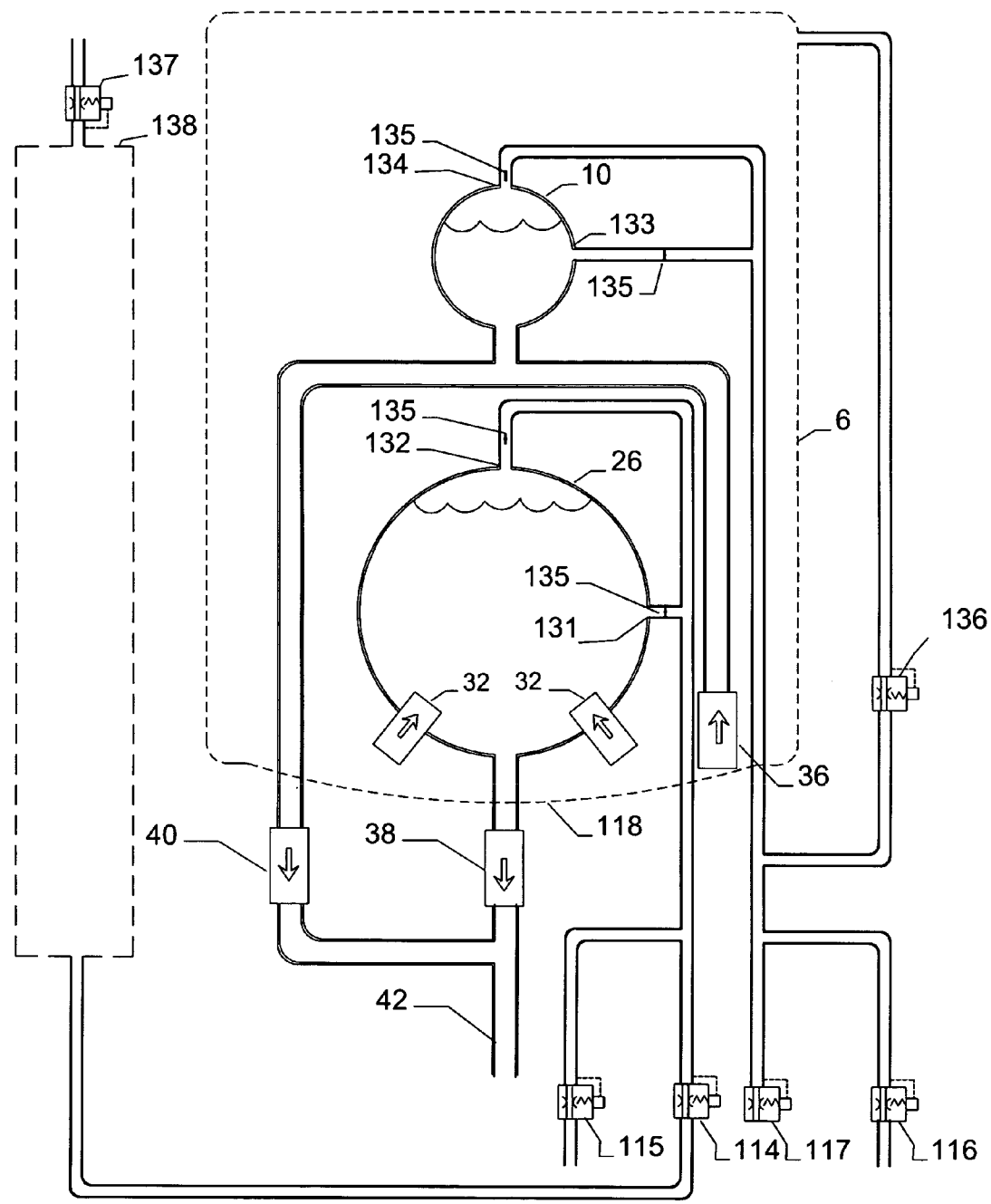
FIG. 11 is a cross sectional view of an alternative embodiment of a multiple chamber pump with spherical chambers and multiple pressurize and vent port locations according to the present disclosure.

The alternative embodiment shown in FIG. 11 includes a sump 118 in the bottom of the tank such that the pump fluid inlet valves extract from the depression, thereby minimizing the amount of fluid in the tank at the end of the pump operation.

Figure 2:
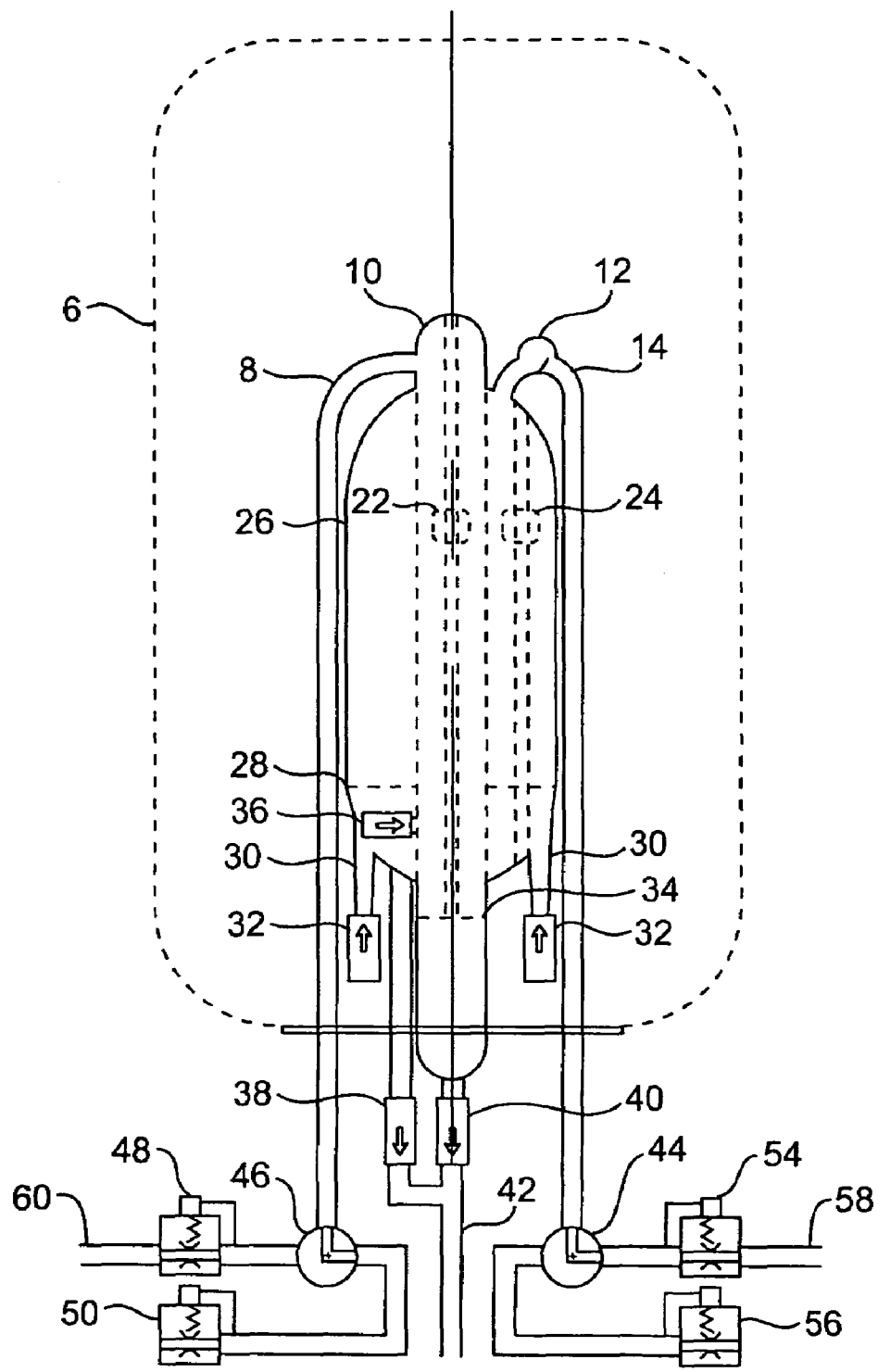
FIG. 2 is a cross sectional view of an alternative embodiment of a multiple chamber pump with an alternate valve arrangement according to the present disclosure.

The alternative embodiment shown in FIG. 2 fills the auxiliary chamber from the primary chamber. In this embodiment, the auxiliary chamber pressure would not need to fall below the main tank pressure, only needing to fall slightly below the primary chamber pressure in order to fill. This embodiment may be used to reduce pressure fluctuations in the output.

Figure 3:
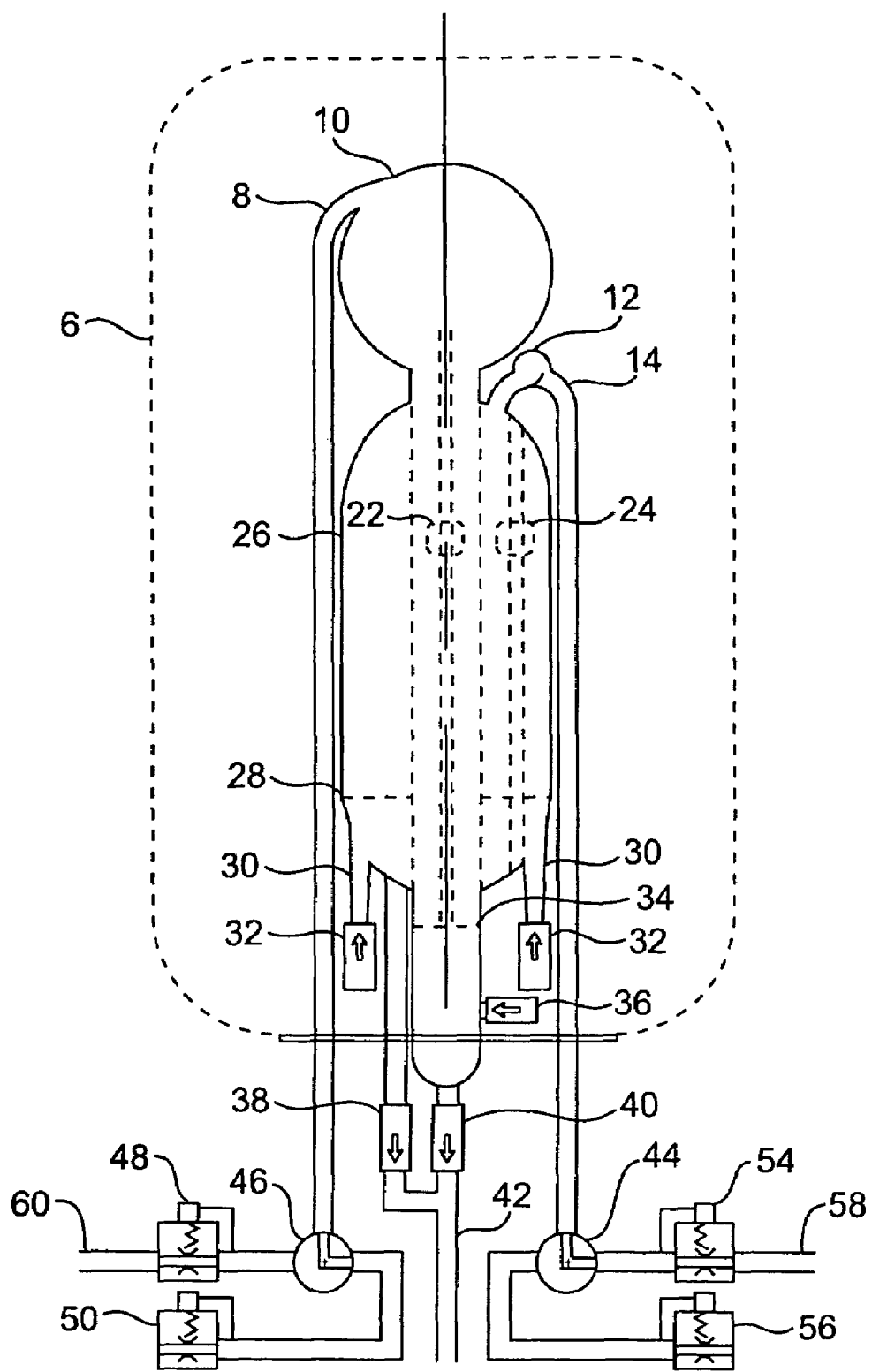
FIG. 3 is a cross sectional view of an alternative embodiment of a multiple chamber pump with the chambers generally stacked serially in relation with each other.

The alternative embodiment shown in FIG. 3 will result in a lower mass pump system, as the primary chamber does not need to include the volume of the auxiliary chamber. The primary chamber may be spherical as shown in FIG. 11 This will further lower the mass of the pump system.

The pump chamber material may be high strength metal or a fiber reinforced composite material. If the pump chamber material is composite, all inlets and outlets can be conducted through metal flanges on either end of the composite chamber.

Figure 8:
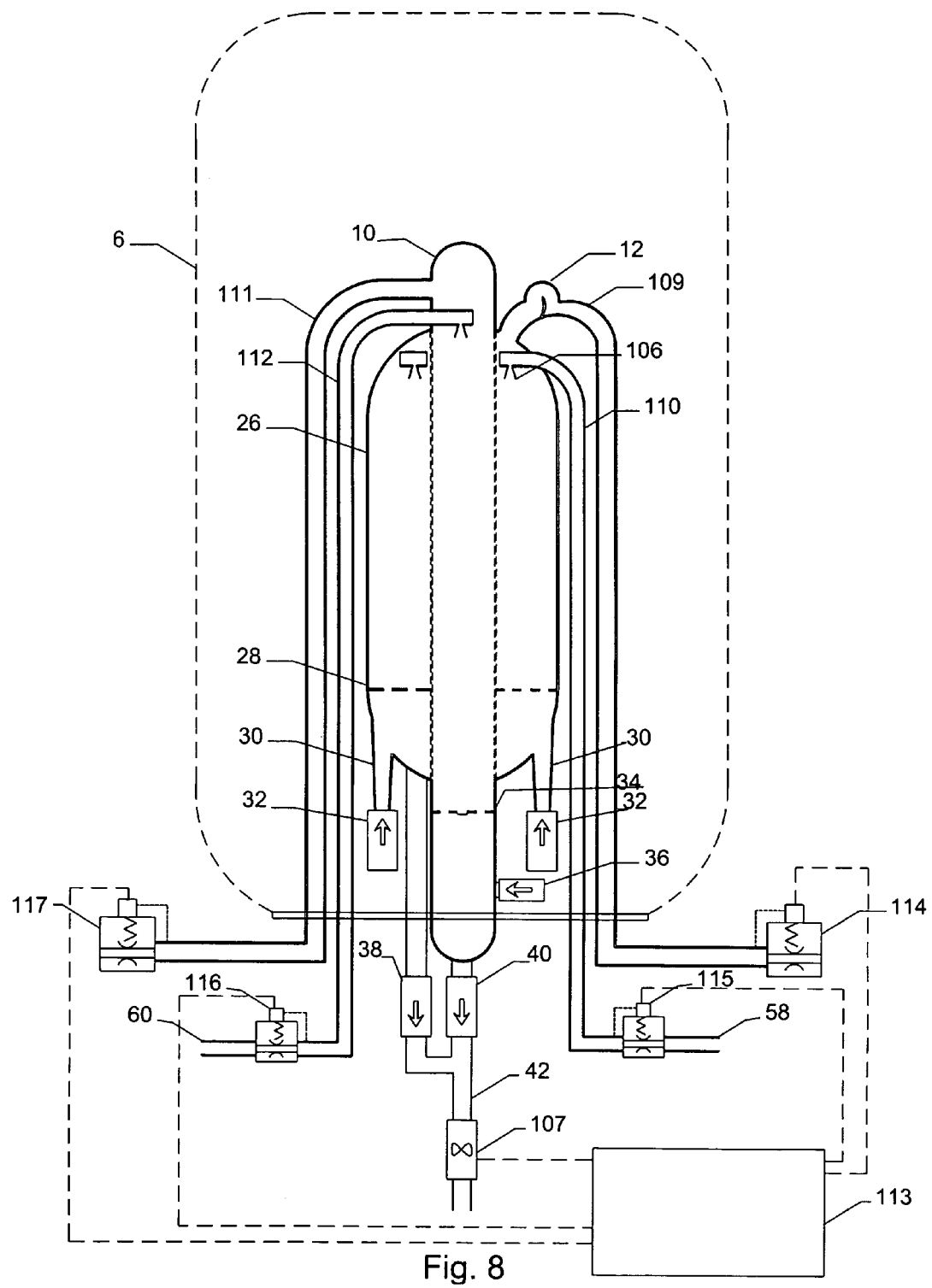
FIG. 8 is a cross sectional view of an alternative embodiment of a multiple chamber pump with an alternate gas valve and tubing arrangement according to the present disclosure.

The alternative embodiment shown in FIG. 8 depicts a pump which keeps the pressurant gas hot during the dispense cycle, thereby reducing the mass flow rate of pressurant used to run the pump. The gas fill 110 and 112 and vent lines 109 and 111 are separate and the fill lines are insulated from the fluid in the tank. The lines may be insulated by plastic foam, or a tube within a tube may be used with a gas in the space between the lines. The space in between the two tubes may be evacuated for additional insulation.

A single gas valve for each pump chamber may be used to reduce the pressure from the source of gas and control the pump chamber pressurization. Such valves are shown in FIG. 8 as valves 115 and 116. These valves combine the function of valves 54 and 44 for the main chamber and valves 48 and 46 for the auxiliary chamber. To minimize pressure spikes in the pump outlet flow, this valve may steadily increase the flow over a period of time approximately equal to $\frac{1}{100}$ to $\frac{1}{20}$ of the pump cycle time. This valve may be a balanced poppet valve, a shrouded butterfly valve, a reduced diameter ball valve or any valve that may be readily controlled. In a similar manner, the valves 114 and 117, used to vent the main and auxiliary chambers to a controlled minimum pressure, combine the functions of valves 44 and 56 for the main chamber and 46 and 50 for the auxiliary chamber.

The pneumatics and hydraulics for the level sensing and valve system may be accomplished by a number of capable methods. The level sensors may be reed switches actuated by magnetic floats or capacitive, acoustical, inductive or optical level sensors. For sensing the level of fluid, in the case of liquid oxygen, the magnetic properties may be utilized. The valves which pressurize and vent the pump chambers can be spool valves, ball valves, piloted solenoid valves, poppet valves or the like.

The pump chambers may also be located outside of the storage tank as shown in FIG. 17. The pump chambers may be mounted on a rocket engine so as to simplify the installation and reduce the amount of high pressure plumbing.

The alternative embodiment in FIG. 17 shows a pump system for use with wing tanks or other very low pressure tanks the pump may be combined with a booster pump such as jet pump or a centrifugal pump 231 to force fluid from a low pressure tank through the inlet check valves into the pump chambers. This booster pump need only be operated when the pump chamber is being filled.

Figures 9A, 9B:
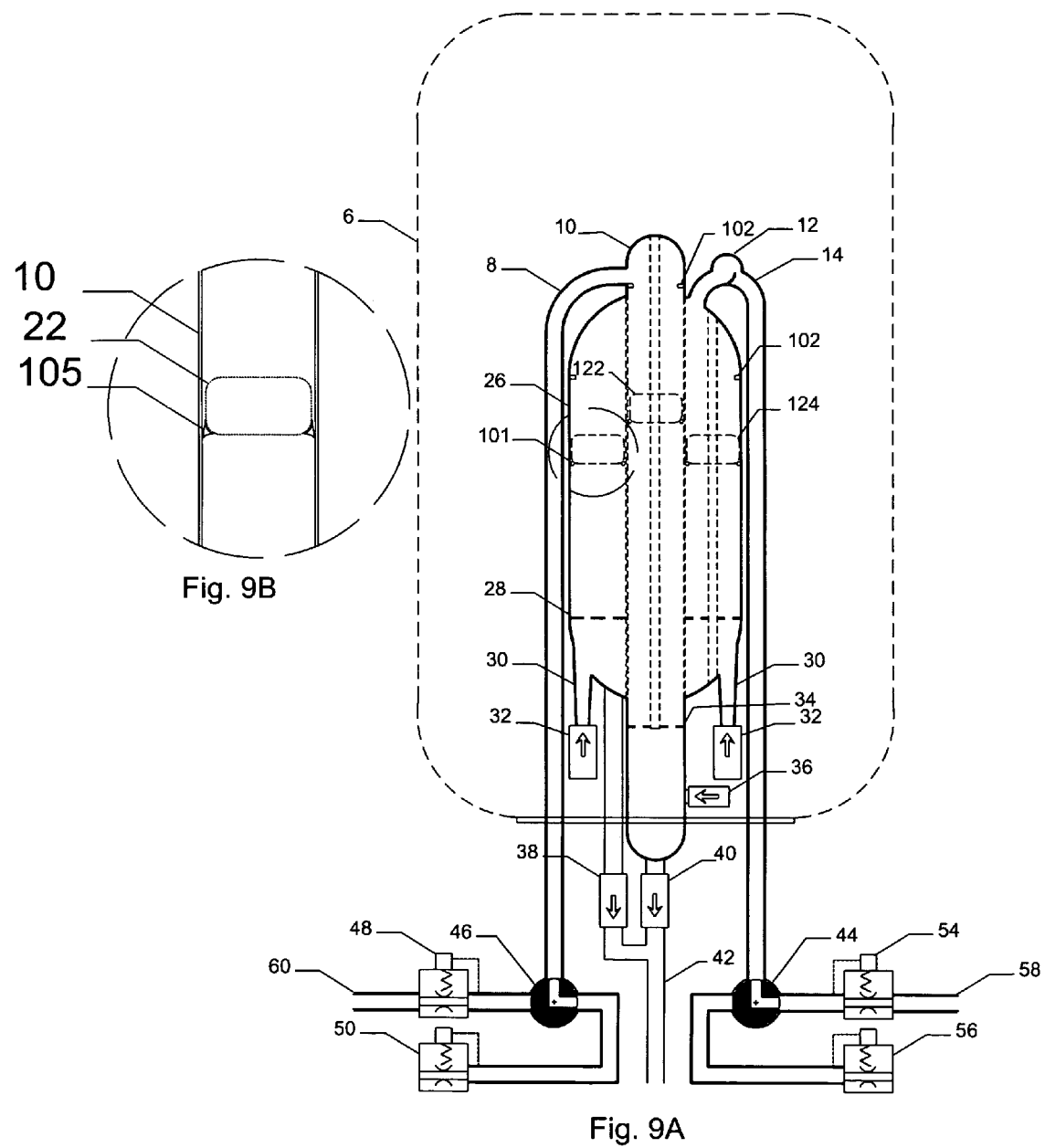
FIGS. 9A-9B are cross sectional views of an alternative embodiment of a multiple chamber pump with a float which separates the gas from the fluid according to the present disclosure.

The alternative embodiment shown in FIG. 9A can use floats or pistons 122 and 124 to separate the gas and liquid in the pump chamber so that a wider variety of pressurizing gases may be used. A low pressure seal 105 shown in the detail of FIG. 9B can be used to keep the liquid and the gas separate. This seal prevents a film of liquid from collecting on the pump walls which may cool the pressurizing gas. For a spherical pump chamber a diaphragm made of material compatible with the liquid and the pressurizing gas may also be used. Materials such as stainless steel, Teflon or Kel-F would be compatible with most rocket propellants. For use with a diaphragm, the pump chamber shape may be an oblate spheroid.

Referring to FIG. 8, the level in the pump chamber may be determined by the use of a flow meter 107 on the pump output. The flow meter may be placed at the output of each chamber or after the outputs of two pump chambers are combined. The level may be determined in the following manner: A float could be used to detect when the pump chamber is full. A turbine meter can be used to measure the flow out of the pump. Once the pump chamber is full, a counter can be set to zero in the electronic control box 113, and the pulses from the turbine flow meter can be counted to determine the amount of fluid in the pump chamber.

A float which shuts the vent valve upon reaching the top of the pump chamber may be used. The conclusion of the venting step may be determined by monitoring the float position or if the presence of the float near the top of the chamber shuts off the vent flow by blocking the vent or by some other means, the end of the vent cycle may be determined by monitoring the flow of gas thought the vent line. When the flow of gas from the vent line ceases, the pump chamber is full and ready to be pressurized.

Figure 13:
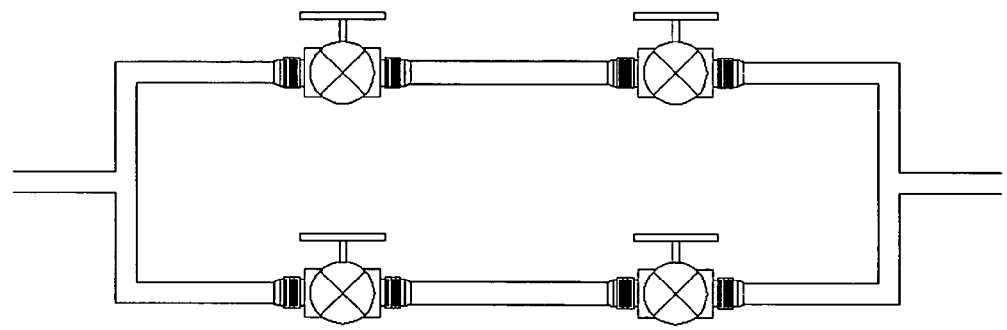
FIG. 13 is a schematic of a series and parallel valve arrangement according to the present disclosure; and, FIG. 14 is a cross sectional view of a lightweight float according to the present disclosure.

The gas valves or the liquid valves may be set up in a series and parallel arrangement to increase the reliability of the pump system. In this system each valve is replaced by four valves. A typical embodiment is shown in FIG. 13. In this manner if any valve fails in the open or shut state, the pump will still function normally. For example, the three position valve 46 or the two position valve 44 may be replaced by two sets of four valves, one set to pressurize the pump chamber and one set to vent it. In another example, any one of the check valves 32,36,38,40 may be replaced by a set of four check valves.

Figure 18:
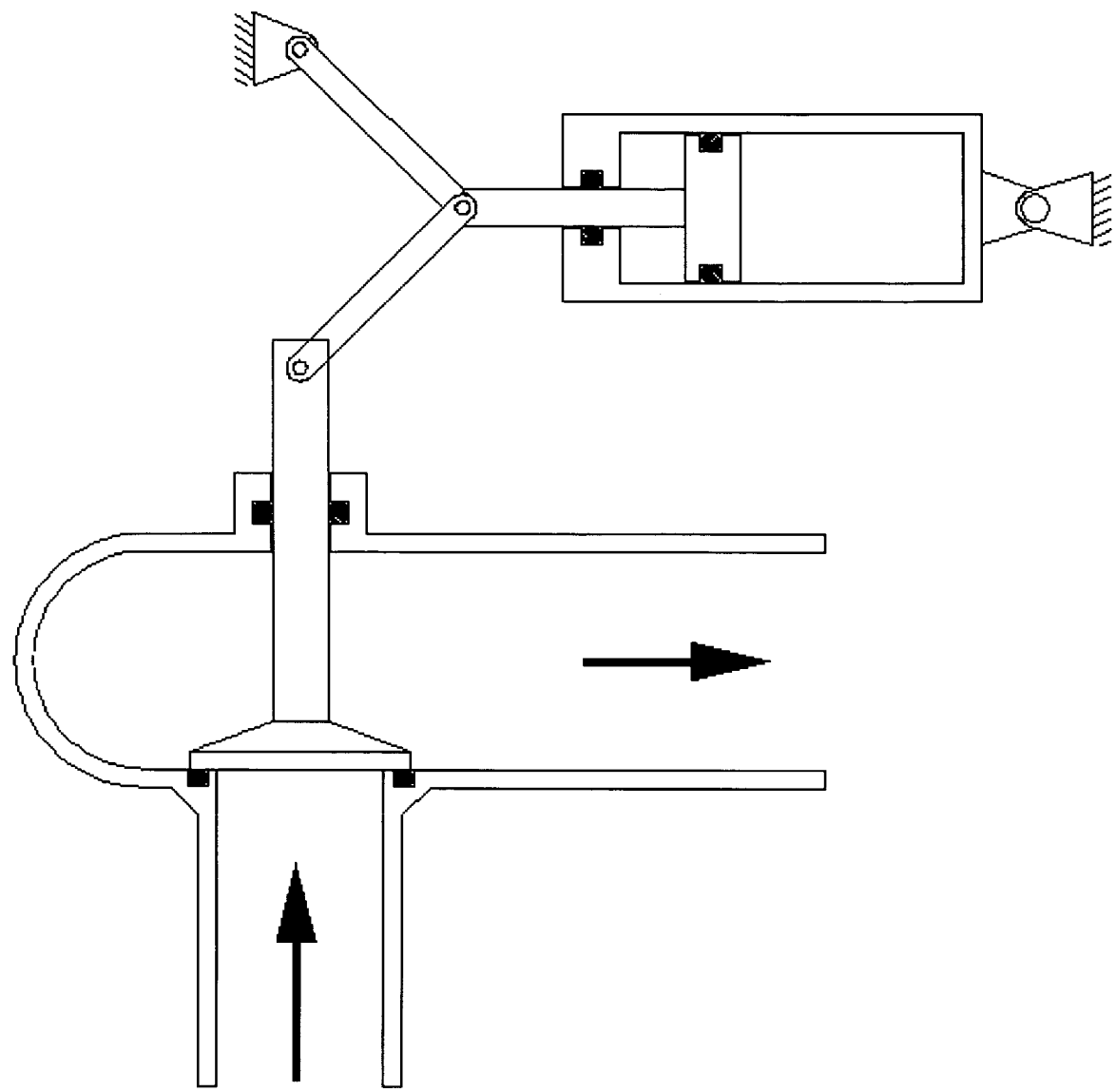
FIG. 18 is a cross sectional view of a toggle actuated valve according to the present disclosure.

As shown in FIG. 18, the fill and vent valves may be actuated by a toggle system that achieves precise movement and maximum force as the valve approaches a closed position. Such toggle actuated valves can be appropriate for the pneumatic pump because the fill and vent valves are typically open under maximum pressure differential and close under nearly zero pressure differential.

As shown in FIG. 11, the vent valve may vent the gas contents of the pump into an additional chamber 138. The gas pressure in the additional chamber may be used to operate another pump, to provide propulsive force or for other uses in the vehicle. A valve, 137 may be used to control the pressure in the additional chamber. A check valve may be used in the input to the additional chamber so that the pressure in it is lower than the pump chamber maximum pressure, but higher than the pump chamber minimum pressure.

The back pressure regulators may be replaced by valves that quickly shut before the pressure falls below the minimum pressure and open if the pressure is over the setpoint. Such valve may need to include a controlled orifice so that as the chamber fills under the pressure of the tank, the valve need not reopen.

The minimum pressure will be such that the fluid entering the pump chamber from the tank will not boil or vaporize. The minimum pressure may be determined by reference to a chart of vapor pressure versus temperature for the fluid being pumped. These charts are well known in the art. For example, liquid oxygen at −183 C must be maintained at a pressure above 1 atmosphere to prevent boiling. The temperature may be determined by a temperature sensor, or it may be estimated based on the known temperature of the fluid when the tank is filled. The minimum pressure will be higher than the vapor pressure in order to account for inaccurate measurements or static pressure variations.

In the case a pump system for use with liquid oxygen at −183 C, the back pressure regulator may be a spring loaded check valve set to open at 1.5 atmospheres pressure differential. This valve would maintain a minimum pressure of 2.5 atmospheres absolute in the chamber while the rocket vehicle is at sea level, and a minimum pressure of 1.5 atmospheres absolute in the pump chamber while the vehicle is in space. In this case the tank pressure could be 3.5 atmospheres in order to provide sufficient pressure to fill the pump chamber quickly.

The vapor pressure may also be sensed by the use of a bulb filled with the fluid being pumped and placed in the tank. A capillary tube can be used to conduct the pressure of the fluid to a back pressure regulating valve. The vapor pressure signal can be augmented by the use of a spring which increases the pressure to a level above the vapor pressure so that as the fluid enters the pump chamber at moderate velocity, the pressure drop associated with the velocity does not cause cavitation or boiling of the fluid.

An electronic system may also be used to control the output pressure, pump chamber minimum pressure and tank pressure. Such a system might optimize the thrust and internal tank pressure to maintain the structural stability of a lightweight rocket vehicle.

Figure 10:
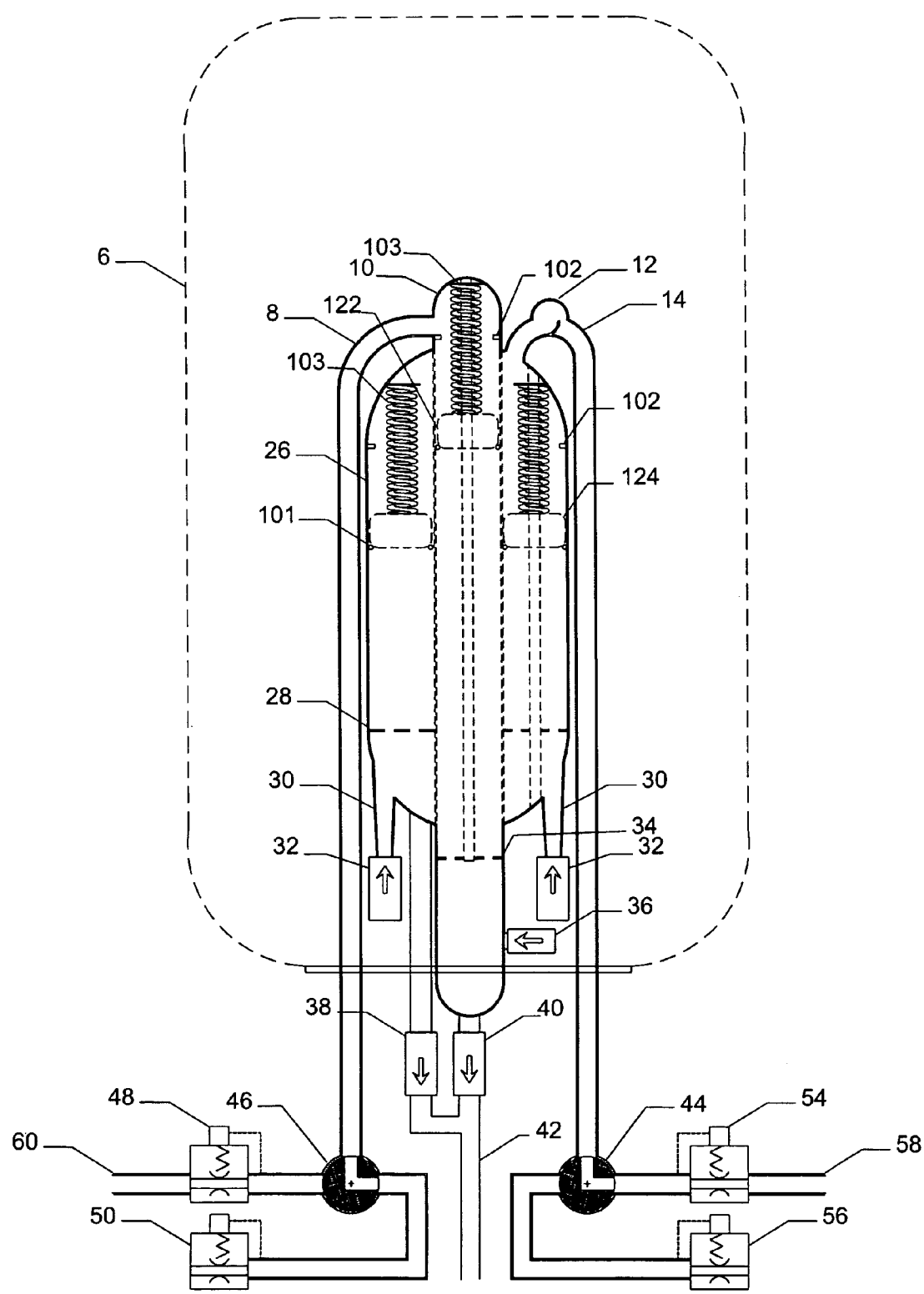
FIG. 10 is a cross sectional view of an alternative embodiment of a multiple chamber pump with spring loaded float which separates the gas from the fluid according to the present disclosure.

The fluid in the pump chamber may also be held under a float or piston under the action of a spring 103 or similar device as depicted in FIG. 10. The main chamber piston 124 and the auxiliary chamber piston 122 can be sealed to the walls of the respective pump chambers by a corresponding low-pressure seal 105 which would be designed to seal against the vapor pressure of the fluid but not the output pressure of the pump. The highest position of the piston 124 or 122 can be limited by a stop, for example 102. This embodiment would be particularly applicable to space vehicles where gravity is reduced and to pumps which pump gelled propellants.

Figure 15:
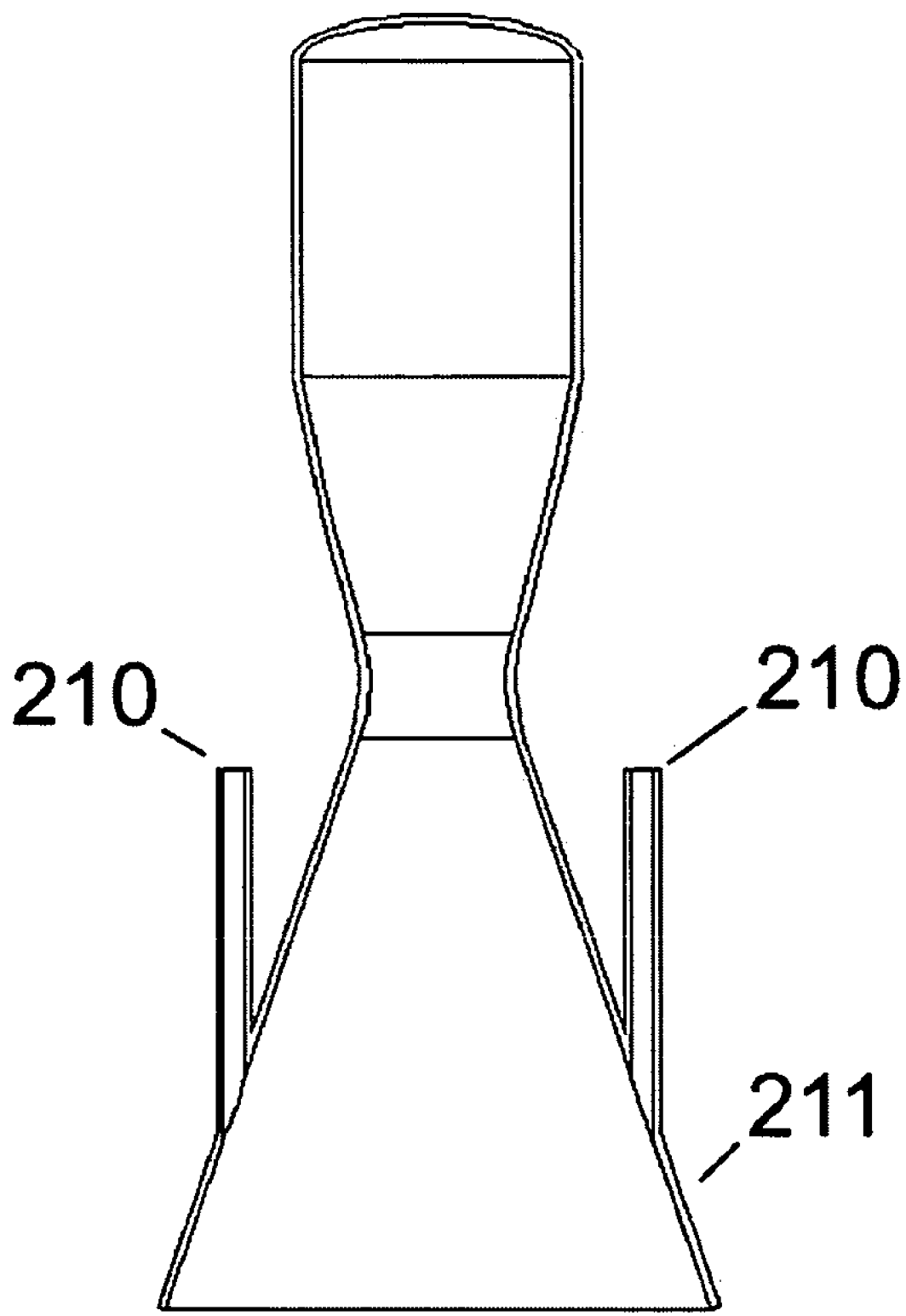
FIG. 15 is a cross sectional view of a rocket thrust chamber with pump exhaust injection according to the present disclosure.

As shown in FIG. 15, the pump may vent through some ducts 210 to some position partway down the expansion portion of rocket nozzle 211 to control the pressure inside the pump and create some extra thrust from the exhaust of the pump. The nozzle 211 can form a portion of a rocket thrust chamber. Typically, the propellant is provided to the combustion chamber of the rocket thrust chamber. The pump exhaust can be routed to the nozzle 211 because the pressure is lower in the nozzle 211. The pressure vs location in an expanding rocket nozzle is well known in the art, and rocket nozzles such as those on the Saturn 5 first stage ducted the turbopump exhaust into the nozzle.

Referring to FIG. 11, The pump may vent some of the gas to the inside of the tank, thereby maintaining the pressure inside the tank with no additional pressurization system. A small valve 136 could be used to allow the pressure from either pump chamber into the tank at the same time as the pump is being vented. The time that the valve is open, or the amount the valve is open could be controlled to adjust the pressure inside the tank. Because the time to fill the auxiliary chamber is not critical, the system shows the valve venting from the auxiliary chamber into the main tank.

Figure 14:
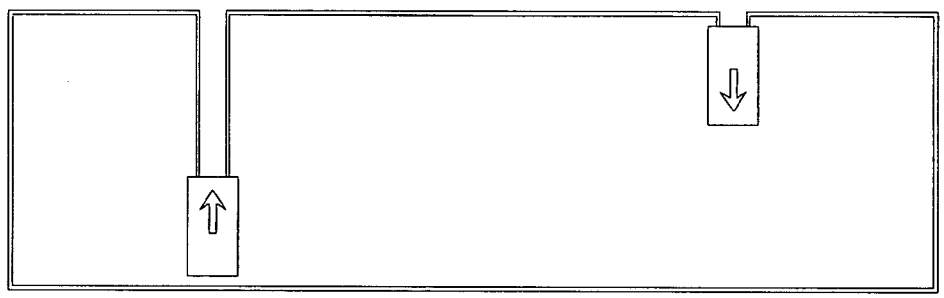

FIG. 14 depicts a float to be used in a pump for pumping low density liquids such as liquid hydrogen or liquid helium. This float operates at a pressure near the internal pressure of the pump chamber. This float includes two check valves, one to let gas into the top of the float, and another check valve to let gas and any liquid which may have accumulated out from the bottom of the float. Because this float has a minimal pressure difference between the inside and the outside, the float can be very lightweight. An installation of such a float in a set of pump chambers is shown in FIG. 17

As shown in FIG. 17, pump chamber walls which are insulated on the interior side or insulated floats may be used so that if the pressurizing gas is at high temperatures, the gas will not be cooled excessively during a pump cycle by contact with the liquid being pumped or by contact with the pump chamber walls. The insulator 230 may be foamed Teflon™ such as Gore-Tex™.

For a pump which uses heated gas as the pressurant, the gas may enter the pump chamber through a diffuser 106 such as is depicted in FIG. 8. The diffuser is designed to keep high velocity gas away from the walls, the fluid, or the float. This reduces the heat transfer from the walls to the heated gas. The diffuser is pictured as an expanding nozzle. Alternate diffusers may be constructed of porous sintered material, baffles or screens placed so as to slow the velocity of the gas entering the pump chamber. Diffuser design is well known in the art.

The pressurizing gas may be helium, liquid helium, which is heated at the engine, or gas from a gas generator. Other gases such as nitrogen or liquid nitrogen may be used instead to minimize cost of the rocket system. If a liquid is to be pumped and then converted into a gas to drive the multiple chamber pump disclosed, another multiple chamber pump as disclosed herein may be used to pump the liquid. For a lower weight system, the gas which runs the fuel pump may be recondensed by the use of a heat exchanger in the fuel tank, which is then pressurized and then vaporized at the engine so that it could be reused, thus saving weight. Steam can also be used as a pressurizing gas.

If the pressure in the tank is known, and the acceleration and gravity forces are known, the level in the tank is known, and the external pressure or back pressure regulator setting is known, then the time to fill the pump chamber can be determined, and no level sensor is required to determine the top level in the pump chambers. This allows a pump which normally uses level sensors to run with failed level sensors, or none at all. In this case the pump can run on a fixed time schedule for the filling cycle.

If the output pressure and flow characteristics are constant, as for example when the pump is connected to a rocket engine, then the pump can run on a fixed time schedule for the dispensing cycle.

If both the inlet and outlet pressure and flow characteristics are fully known, then the whole pump cycle can by run on a fixed time schedule and no level or flow sensors are required. This method can be used in the event of a sensor failure, or it can be the normal operational mode.

The pump can be operated by multiple redundant computer systems in order for maximum reliability. When combined with the ability to run with failed flow and level sensors, the pump can be made very reliable as would be required for use with a vertical takeoff and vertical landing vehicle.

Referring to FIG. 11, for use in a horizontal takeoff vehicle two pump vent locations may be used, one which is on the top of the pump chambers 132 and 134, to be used during acceleration, and one on the side of the pump chambers 131 and 133, to be used during the first filling cycle of the pump and also during ground test firings of the engine. A set of valves 135 can be used to select which vent location is to be used for a given condition. The pump in FIG. 11 is set for vertical acceleration.

For use in a vehicle which utilizes both rocket engine and jet engines, the pump may be used to supply fuel for both the jet engine and the rocket. In this case the pump will not be able to take advantage of the use of heated gas because the cycle time will be longer when running the jet engine, but the pump will not use substantially more gas than a typical pressure fed system.

For use in a vehicle with a rocket attitude control engines, the pump may supply propellant for both the main rocket engine and the attitude control rocket engines. The pump may also provide propellant for landing rockets.

The inlet check valves, the vent valves and plumbing may be sized so that the time required to fill the pump is less than approximately 1 second. The time for the pump chamber to vent and fill includes a initial period when the gas flows at sonic velocity through the vent line, a period when the gas flows at subsonic velocity through the vent line, and then once the gas pressure has fallen below the tank pressure, the inertia of the inlet check valve and the fluid being pumped can be overcome before the pump chamber can be filled. The sizing of valves and tubing for these situations is well known in the art.

The sizing of the outlet check valves and tubing may be determined by limiting the flow velocity such that the dynamic pressure is much less than the output static pressure. The pressure drop across the check valves should also be much less than the static pressure. The flow losses from both the main and auxiliary chambers should be matched by using similar outlet check valves and similar plumbing geometry.

In order to maintain an accurate pressure output, the fluid outlet pressure may be monitored and the gas pressure may be controlled based on the fluid outlet pressure. Either the total pressure or the static pressure of the outflow may be monitored.

The propulsive force generated by the vent may be used for attitude control in a vehicle which uses the pump. Alternatively, the vent may be ducted equally to either side of a vehicle to nullify any propulsive effect.

Figure 19:
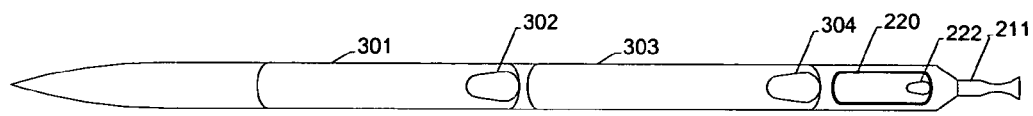
FIG. 19 is a cross sectional view of a rocket system according to the present disclosure.

FIG. 19 shows an embodiment of a liquid rocket system which uses an embodiment of the pneumatically driven multi-chamber pump. It contains an oxidizer tank 301 with an oxidizer pump 302. It also contains a fuel tank 303 with a fuel pump 304. The liquid helium is stored in a Dewar 220. The Dewar contains a liquid helium pump 222. The rocket system also contains a rocket engine 211. The relative sizes of the components are correct for a liquid oxygen and kerosene rocket. The plumbing, heat exchangers and the power source for the liquid helium are not shown, as these do not contribute significantly to the weight of the vehicle.

While the preferred embodiment of the present disclosure has been shown and described, it will be apparent to those skilled in the art that various modifications may be made in the embodiment without departing from the spirit of the present disclosure. Such modifications are all within the scope of the invention.

What is claimed is:

1. A pneumatically driven multiple chamber fluid pump for use in reduced absolute pressure environments, wherein environmental pressure is lower than a vapor pressure of a fluid being pumped, the pump comprising:
   a primary chamber with a primary chamber volume capacity;
   an auxiliary chamber with an auxiliary chamber volume capacity;
   an outlet coupled to the primary chamber and the auxiliary chamber; and
   a vent system coupled to the primary chamber and the auxiliary chamber, configured to operate in the reduced absolute pressure environment and configured to maintain a pressure greater than the vapor pressure of the pumped fluid within each of the primary chamber and the auxiliary chamber.

2. The pneumatically driven multiple chamber pump of claim 1, wherein the primary chamber is configured to provide fluid to the outlet during at least a portion of time that the auxiliary chamber is being filled.

3. The pneumatically driven multiple chamber pump of claim 1, wherein the vent system comprises a check valve having a spring configured to bias the check valve in a closed position coupled to at least one of the primary chamber or the auxiliary chamber, and configured to maintain the predetermined pressure in the chamber above the vapor pressure of the pumped fluid contained within the chamber.

4. The pneumatically driven multiple chamber pump of claim 1, including a semi-sealed float in at least one of the primary chamber or the auxiliary chamber, wherein the semi-sealed float includes a seal to maintain gas separate from the pumped fluid in the at least one of the primary chamber or the auxiliary chamber, and configured to maintain pressure greater than the vapor pressure of the pumped fluid in the at least one of the primary chamber or the auxiliary chamber.

5. The pneumatically driven multiple chamber pump of claim 4, wherein the vent system further comprises a spring configured to bias the semi-sealed float against the fluid in the chamber.

6. The pneumatically driven multiple chamber pump of claim 1, wherein the vent system comprises a toggle actuated valve positioned to control flow in at least one of a pressure or vent line for at least one of the primary chamber or the auxiliary chamber.

7. The pneumatically driven multiple chamber pump of claim 1, further comprising a fluid storage tank, and wherein the vent system is configured to vent at least one of the primary chamber or the auxiliary chamber to at least partially pressurize the fluid storage tank.

8. The pneumatically driven multiple chamber pump of claim 1, further comprising a rocket thrust chamber coupled to the outlet, and wherein the vent system is configured to vent pressurized gas from at least one of the primary chamber or the auxiliary chamber to a position along an expansion portion of the rocket thrust chamber.

9. The pneumatically driven multiple chamber pump of claim 1, further comprising an unpressurized substantially hollow float positioned within the primary chamber and configured to determine a fluid level within the primary chamber.

10. The pneumatically driven multiple chamber pump of claim 9, wherein the unpressurized substantially hollow float comprises:
a float body;
an inlet check valve coupled to the float body and configured to allow gasses to enter the float body; and
an outlet check valve coupled to the float body and configured to vent the float body.

11. The pneumatically driven multiple chamber pump of claim 1, further comprising an insulated float within at least one of the primary chamber or the auxiliary chamber, and configured to monitor a fluid level within the chamber and prevent cooling of pressurization gas by the pumped fluid.

12. The pneumatically driven multiple chamber pump of claim 1, further comprising a fluid storage tank having a recessed sump area; and wherein a primary chamber intake and an auxiliary chamber intake are positioned at least partially in the recessed sump area.

13. The pneumatically driven multiple chamber pump of claim 1, further comprising a diffuser coupled to a pressurization gas inlet, of the at least one of the primary chamber or the auxiliary chamber, wherein the diffuser is configured to slow a velocity of the pressurization gas entering the chamber.

14. The pneumatically driven multiple chamber pump of claim 1, wherein an internal wall of the primary chamber is thermally insulated and configured to reduce heat transfer from a pressurization gas to the pumped fluid.

15. The pneumatically driven multiple chamber pump of claim 1, further comprising a double-D check valve having two movable elements and configured as a fluid inlet for the primary chamber.

16. The pneumatically multiple chamber pump of claim 1, further comprising a storage tank configured to store the fluid pumped by the pneumatically multiple chamber pump, the storage tank located internally of a rocket system.

17. The pneumatically multiple chamber pump of claim 1, further comprising a liquid helium storage tank configured to store helium used to pressurize the primary chamber and the auxiliary chamber.

18. The pneumatically multiple chamber pump of claim 17, wherein the liquid helium storage tank comprises a vacuum insulated helium storage tank.

19. The pneumatically multiple chamber pump of claim 17, further comprising a heater positioned within the liquid helium storage tank and configured to heat a portion of the helium in the helium storage lank to vaporize the liquid helium and achieve a desired pressure within the helium storage tank.

20. The pneumatically multiple chamber pump of claim 17, further comprising a helium pump coupled to the liquid helium storage tank and configured to pressurize helium from the liquid helium storage tank and supply the pressurized helium to at least one of the primary chamber or the auxiliary chamber.

21. The pneumatically driven multiple chamber pump of claim 1, further comprising:
a fluid inlet on the primary chamber and configured to supply the pumped fluid to the primary chamber; and
a baffle positioned within the primary chamber and configured to calm the fluid during entry into the primary chamber.

22. A pneumatically driven multiple chamber pump for use in reduced absolute pressure environments wherein environmental pressure is lower than a vapor pressure of fluid being pumped, the pump comprising:
a primary chamber with a primary chamber volume capacity and having a primary chamber inlet configured to allow fluid to enter the primary chamber;
an auxiliary chamber with an auxiliary chamber volume capacity and having an auxiliary chamber inlet configured to allow fluid to enter the auxiliary chamber;
an outlet coupled to the primary chamber and the auxiliary chamber, the primary chamber configured to dispense fluid through the outlet during at least a portion of time that fluid enters the auxiliary chamber fills and the auxiliary chamber configured to dispense fluid through the outlet during at least a portion of time that fluid enters the primary chamber;
a pressurization system coupled to the primary chamber and the auxiliary chamber and configured to pressurize the primary chamber prior to the time the primary chamber dispenses fluid through the outlet and configured to pressurize the auxiliary chamber prior to the time the auxiliary chamber dispenses fluid through the outlet; and
a vent system coupled to the primary chamber and the auxiliary chamber, and configured to maintain at least a pressure greater than the vapor pressure of the pumped fluid within each of the primary chamber and the auxiliary chamber.

23. A pneumatically driven multiple chamber pump for use in reduced absolute pressure environments wherein environmental pressure is lower than a vapor pressure of fluid being pumped, the pump comprising:
a fluid storage tank positioned internal of a rocket system;
a rocket thrust chamber;
a primary chamber comprising an inlet valve configured to accept fluid from the storage tank during a primary fill portion of a pump cycle, and an outlet valve configured to dispense fluid from the primary chamber to the rocket thrust chamber during a primary dispense portion of the pump cycle;
an auxiliary chamber comprising an inlet valve configured to accept fluid from the storage tank during an auxiliary fill portion of the pump cycle that occurs at least partially during the primary dispense portion, and an outlet valve configured to dispense fluid from the auxiliary chamber to the rocket thrust chamber during an auxiliary dispense portion of the pump cycle that occurs at least partially during the primary fill portion;
a pressurization system coupled to the primary chamber and the auxiliary chamber and configured to pressurize the primary chamber prior to the primary dispense portion of the pump cycle and configured to pressurize the auxiliary chamber prior to the auxiliary dispense portion of the pump cycle;
a diffuser coupled to the pressurization system and a pressurization gas inlet of at least one of the primary chamber or the auxiliary chamber and configured to slow a velocity of a pressurization gas entering the at least one of the primary chamber or the auxiliary chamber; and
a vent valve system coupled to the primary chamber and the auxiliary chamber, and configured to vent the primary chamber and auxiliary chamber following the respective dispense portions of the pump cycle while maintaining at least a pressure greater than the vapor pressure of the pumped fluid within each of the primary chamber and the auxiliary chamber.

24. A method of pneumatically driving a multiple chamber pump in a reduced absolute pressure environment where environmental pressure is lower than a vapor pressure of fluid being pumped, the method comprising:

accepting fluid in a primary chamber from a fluid storage tank during a primary fill portion of a pump cycle;
  pressurizing the primary chamber with pressurization gas during a primary pressurization portion of the pump cycle;
  dispensing fluid from the primary chamber to a rocket thrust chamber during a primary dispense portion of the pump cycle;
  venting the primary chamber during a primary vent portion of the pump cycle while maintaining pressure in the primary chamber above the vapor pressure of the pumped fluid;
  accepting fluid in an auxiliary chamber from the fluid storage tank during an auxiliary fill portion of the pump cycle, wherein the auxiliary fill portion of the pump cycle occurs during a portion of the primary dispense portion;
  pressurizing the auxiliary chamber with pressurization gas during an auxiliary pressurization portion of the pump cycle, wherein the auxiliary pressurization portion of the pump cycle occurs during a portion of the primary dispense portion;
  dispensing fluid from the auxiliary chamber to the rocket thrust chamber during an auxiliary dispense portion of the pump cycle; and
  venting the auxiliary chamber during an auxiliary vent portion of the pump cycle while maintaining pressure in the auxiliary chamber above the vapor pressure of the pumped fluid.

* * * * *